United States Patent
Roure

(10) Patent No.: US 11,215,721 B2
(45) Date of Patent: Jan. 4, 2022

(54) JOINT INVERSION OF COMPRESSIONAL AND SHEAR SEISMIC DATA IN NATIVE TIME DOMAINS

(71) Applicant: CGG SERVICES SAS, Massy (FR)

(72) Inventor: Benjamin Roure, Calgary (CA)

(73) Assignee: CGG SERVICES SAS, Massy (FR)

(*) Notice: Subject to any disclaimer, the term of this patent is extended or adjusted under 35 U.S.C. 154(b) by 604 days.

(21) Appl. No.: 15/329,458

(22) PCT Filed: Aug. 18, 2015

(86) PCT No.: PCT/IB2015/001554
§ 371 (c)(1),
(2) Date: Jan. 26, 2017

(87) PCT Pub. No.: WO2016/027156
PCT Pub. Date: Feb. 25, 2016

(65) Prior Publication Data
US 2017/0322331 A1    Nov. 9, 2017

Related U.S. Application Data

(60) Provisional application No. 62/038,935, filed on Aug. 19, 2014.

(51) Int. Cl.
*G01V 1/48* (2006.01)
*G01V 1/28* (2006.01)
*G01V 1/30* (2006.01)

(52) U.S. Cl.
CPC .............. *G01V 1/284* (2013.01); *G01V 1/301* (2013.01); *G01V 1/305* (2013.01)

(58) Field of Classification Search
CPC .......... G01V 1/284; G01V 1/301; G01V 1/305
See application file for complete search history.

(56) References Cited

U.S. PATENT DOCUMENTS

| | | | | |
|---|---|---|---|---|
| 4,839,869 A | * | 6/1989 | Corcoran | G01V 1/286 367/38 |
| 6,639,871 B1 | * | 10/2003 | Garotta | G01V 1/286 367/75 |
| 8,255,166 B2 | * | 8/2012 | Tonellot | G01V 1/30 702/16 |
| 8,792,303 B2 | | 7/2014 | Downton et al. | |
| 9,792,303 B2 | | 10/2017 | Sayre, III et al. | |

(Continued)

OTHER PUBLICATIONS

International Search Report in related International Application No. PCT/IB2015/001554, dated Jan. 18, 2016.

(Continued)

*Primary Examiner* — Krystine E Breier
(74) *Attorney, Agent, or Firm* — Patent Portfolio Builders PLLC

(57) ABSTRACT

PP and PS seismic data are jointly inverted in a stratigraphic grid, using different time axes for PP and PS reflections. A ratio of PP and of PS waves' travel times inside a same layer cell maintained to be a function of a ratio of a P-wave propagation velocity and of an S-wave propagation velocity therein. Since PP and PS seismic amplitudes and travel times are due to elastic properties of the same structure, they can be inverted at the same time to provide better estimates of these elastic properties.

18 Claims, 8 Drawing Sheets

(56) References Cited

U.S. PATENT DOCUMENTS

| | | | | |
|---|---|---|---|---|
| 2006/0023569 A1* | 2/2006 | Agullo | ............ | G01V 1/301 |
| | | | | 367/73 |
| 2015/0241582 A1* | 8/2015 | Kahn | ............ | G06F 30/20 |
| | | | | 703/2 |
| 2016/0018541 A1* | 1/2016 | Stefani | ............ | G01V 1/32 |
| | | | | 702/14 |
| 2016/0341835 A1* | 11/2016 | Guillaume | ............ | G01V 1/282 |

OTHER PUBLICATIONS

Written Opinion of the International Searching Authority in related International Application No. PCT/IB2015/001554, dated Jan. 18, 2016.

P.F. Anderson et al., "A Comparison of Inversion Techniques for Estimating Vp/Vs from 3D Seismic Data", CREWES Research Report, 2008, vol. 20, pp. 1-21.

J-P Coulon et al., "Stratigraphic Elastic Inversion for Seismic Lithology Discrimination in a Turbiditic Reservoir", SEG Annual Meeting, New Orleans, Louisiana, 2006, SEG Technical Expanded Abstracts, pp. 2092-2096.

Y. Lafet et al., "Global 4-D Seismic Inversion and Time-lapse Fluid Classification", SEG International Exposition and Annual Meeting, Houston, Texas, 2009, SEG Technical Expanded Abstracts, pp. 3830-3834.

* cited by examiner

JOINT INVERSION OF COMPRESSIONAL AND SHEAR SEISMIC DATA IN NATIVE TIME DOMAINS

CROSS REFERENCE TO RELATED APPLICATIONS

This application claims priority and benefit from U.S. Provisional Patent Application No. 62/038,935, filed on Aug. 19, 2014, for "Joint PP-PS Inversion Without Data Registration," the entire content of which is incorporated in its entirety herein by reference.

BACKGROUND

Technical Field

Embodiments of the subject matter disclosed herein generally relate to seismic data processing, more particularly, to jointly inverting compression and shear seismic amplitudes in their native time domains and optimizing mapping between the same geological features observed on compression and shear seismic data at different travel times (due to the difference between the propagation velocities of compression and of shear waves) through travel times estimation.

Discussion of the Background

Seismic surveys record seismic waves emerging from an explored geophysical structure to generate images thereof. The presence or absence of oil and/or gas reservoirs can be assessed based on the images.

Seismic waves emerging from the explored geophysical structure are caused by incident seismic waves generated by a seismic source. Seismic sources typically generate longitudinal waves, also known as P-waves, primary or compression waves, as they produce compression and rarefaction along the propagating direction. These incident P-waves are reflected and refracted at interfaces between layers, with the layers being distinguished by different impedances (i.e., the product of wave propagation velocities and density). The reflected waves are P-waves and S-waves (which are transverse waves in which seismic oscillations are perpendicular to the wave propagation direction; these waves are also known as secondary or shear waves). While the P-waves' reflection angle is equal to the incidence angle, the S-waves' reflection angle is different from the incidence angle because the S-waves' propagation velocity, $V_S$, inside a layer differs from the P-waves' propagation velocity, $V_P$.

Seismic data acquired during seismic surveys is usually samples of amplitude versus time for P- and S-waves detected by receivers, known as PP or compression seismic data and PS or shear seismic data, respectively (the first letter indicating the type of incident waves and the second indicating the type of reflected waves). More generally, if a seismic source can generate S shear waves, it is also possible to record SS waves corresponding to the incident S waves reflected as S-waves, and SP waves corresponding to the incident S-waves reflected as P-waves. Using both PP and PS data yields better images of the explored structure.

PP and PS seismic data carries information about depths of the reflecting interfaces, for example, in two-way travel time (TWT) to and from each reflecting layer interface. In order to obtain the depths of reflecting interfaces from the seismic data, the waves' propagation velocities have to be known. This knowledge is difficult to insert. Variations in the recorded amplitudes related to a same interface occur at different times from the incident wave's emission in the PP seismic data than in the PS seismic data (in other words, the reflector-related events are not aligned). These time shifts are related to differences in the propagation velocities, $V_P$ versus $V_S$.

FIG. 1 illustrates two graphs (amplitudes versus a common vertical time axis) illustrating a synthetic PP seismic trace (left) generated at an angle of P-wave incidence of 30 degrees and the corresponding PS trace (right). The modeled traces show different amplitudes, frequency content and travel times. The difference in time scale is controlled by the $V_P/V_S$ ratio which can vary both laterally and vertically.

A known seismic data analysis method is inversion as described, for example, in the article, "Stratigraphic Elastic Inversion for Seismic Lithology Discrimination in A Turbiditic Reservoir," by J-P Coulon at al., published in SEG Expanded Abstract, New Orleans 2006 Annual Meeting, the contents of which is incorporated in its entirety herein by reference. Inversion is, in general terms, a data processing method that identifies a model of the explored structure. An initial model may be based on elastic parameters obtained indirectly (e.g., measurements independent from the seismic data acquisition). For example, log data, which represents geophysical properties (e.g., $V_P$, $V_S$, density) measurements in a well, may be used (extrapolated) to generate the initial model. The initial model is perturbed within a predetermined framework.

Test models produced starting from the initial model are used to generate synthetic data (i.e., predicted seismic data in view of a model). Synthetic data produced using a test model is compared with the acquired seismic data. The model that minimizes the difference between the seismic data and the synthetic data is the solution. The inversion updates the initial values of the geophysical properties using the values in the final model.

Due to the difference between PP and PS TWT for the same layer interface, conventional inversion methods require the PS seismic data to be aligned with the PP data to be then jointly inverted in a common time domain. The data alignment is sometimes called "registration" and in the title of the provisional application mentioned at the beginning of this application "without registration" meant without performing this alignment. However, the general meaning of "registration" is mapping PP and PS events to same structural features of the probed structure. It is difficult to align PP and PS data correctly and undesirable deviations from the actual underlying structure have a major impact on the inversion results. Details on the data alignment ("registration") are presented in the article, "A comparison of inversion techniques for estimating Vp/Ns from 3D seismic data," by Anderson, P., and L. Lines, published in CREWES Research report 2008, Volume 20, the contents of which is incorporated in its entirety herein by reference. Even if the data alignment is perfect (i.e., same-interface related events are perfectly aligned for the PP and PS data), the impact of the alignment on PS amplitude may be significant, and the associated squeeze may damage the Amplitude-Versus-Offset (AVO), which ultimately affects the estimates of the elastic properties.

Another down side of conventional inversion methods is that the $V_P/V_S$ ratio used to align the data is usually not incorporated into the inversion. In other words, data alignment is performed once in the beginning and not reiterated with the $V_P/V_S$ values optimized during the inversion.

Therefore, it would be desirable to provide inversion methods and devices that would enable jointly inverting PP and PS data without the above-outlined drawbacks of conventional methods.

SUMMARY

Joint inversion of PP and PS seismic amplitudes is performed in native time domains using one time axis for PP data and another time axis for PS data, without data alignment beforehand. The registration for PP and PS data (i.e., mapping on the structure's geophysical features) is optimized during the inversion by constraining the ratio of PP to PS travel times of an incident P-wave and a P-wave reflection or an S-wave reflection in layers based on the ratio of the P-wave and the S-wave propagation velocities.

According to one embodiment, there is a method for simultaneously inverting PP and PS seismic in native time domains with optimized registration through travel times' estimations. The method includes obtaining PP and PS seismic data acquired during a seismic survey of a multi-layer structure. The method further includes jointly inverting the PP and the PS seismic data in a stratigraphic grid, using different time axes for PP and PS reflections. A ratio of PP and of PS waves travel times inside a same layer cell is a function of a ratio of a P-wave propagation velocity and of an S-wave propagation velocity therein.

According to another embodiment, there is an apparatus for seismic data processing. The apparatus includes a communication interface configured to obtain PP and PS seismic data acquired during a seismic survey of a multi-layer structure. The apparatus further includes a data processing unit configured to jointly invert the PP and the PS seismic data in a stratigraphic grid, using different time axes for PP and PS reflections. A ratio of PP and of PS waves travel times inside a same layer cell is a function of a ratio of a P-wave propagation velocity and of an S-wave propagation velocity therein.

According to yet another embodiment, there is a computer-readable recording medium non-transitorily storing executable codes which, when executed on a computer, make the computer perform a method for simultaneously inverting PP and PS seismic amplitudes in native time domains with optimized registration through travel times' estimations. The method includes obtaining PP and PS seismic data acquired during a seismic survey of a multi-layer structure. The method further includes jointly inverting the PP and the PS seismic data in a stratigraphic grid, using different time axes for PP and PS reflections. A ratio of PP and of PS waves travel times inside a same layer cell is a function of a ratio of a P-wave propagation velocity and of an S-wave propagation velocity therein.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed using terminology of seismic data processing. Although most of embodiments refer to joint (i.e., simultaneous) PP and PS inversion, other sets of data may be combined (e.g., SP seismic data and SS seismic data, electromagnetic data, etc.). The seismic data may be acquired on land or by using an ocean-bottom network of detectors (because S-waves are lost in water).

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
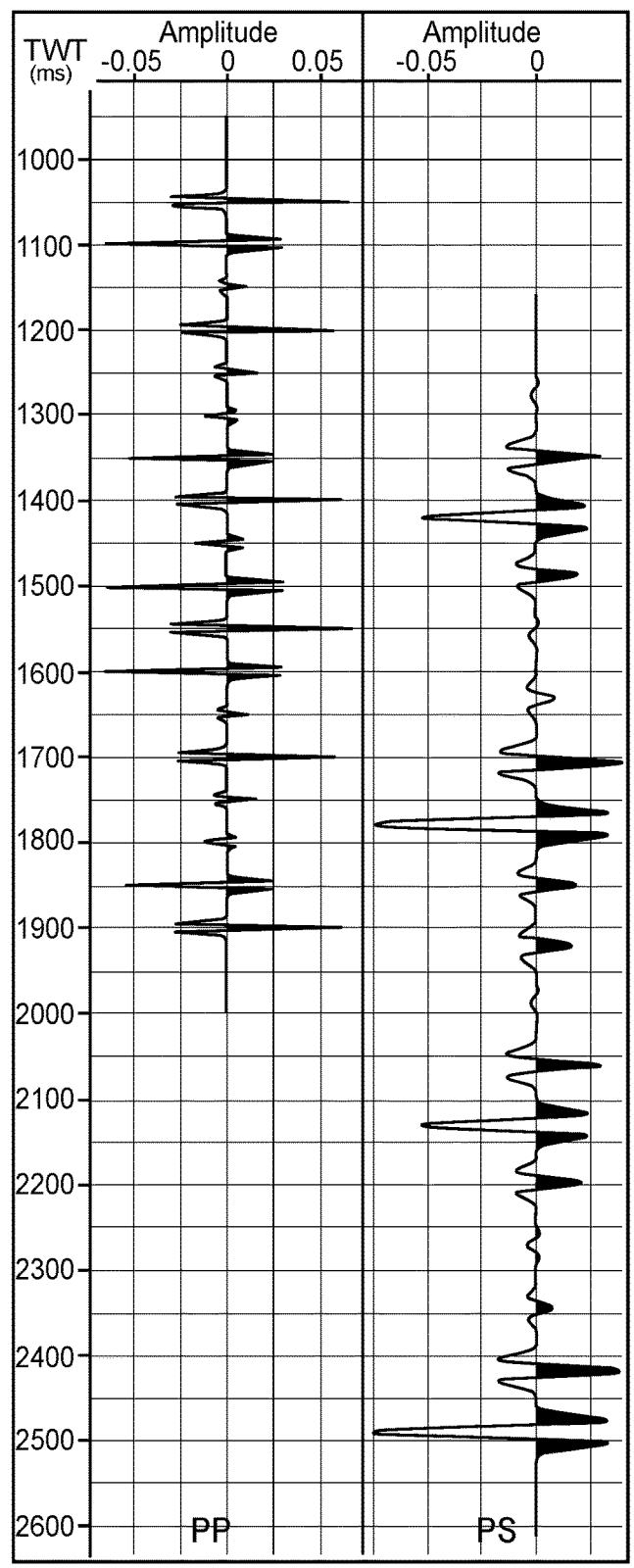
FIG. 1 illustrates PP and PS seismic data in time.
Figure 2:
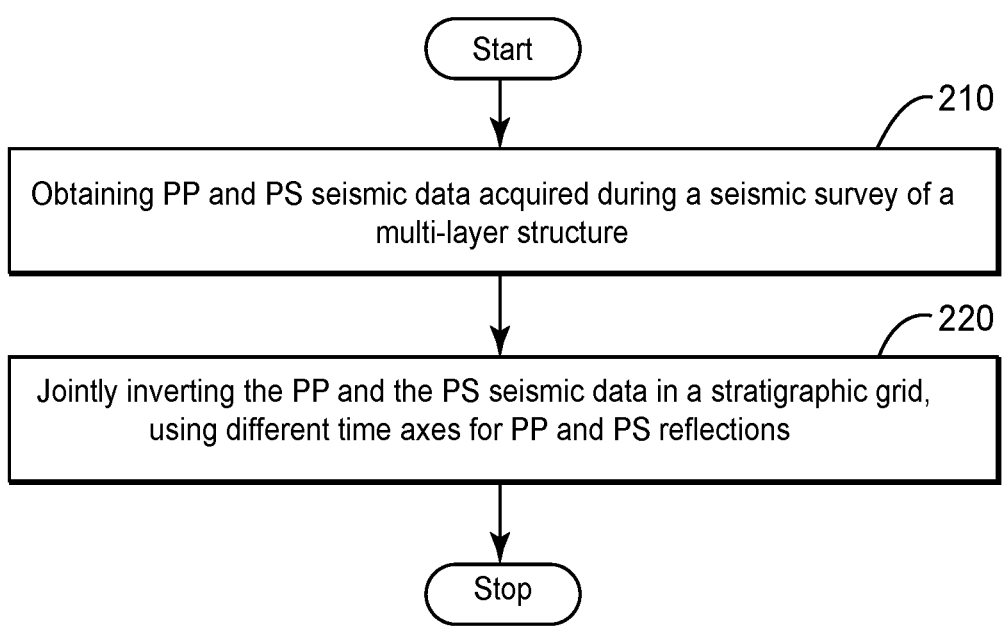
FIG. 2 is a flowchart of a method for obtaining images of a multi-layer structure by simultaneous PP and PS seismic amplitudes inversion without prior alignment of the PP and PS data, according to an embodiment.

A joint inversion of PP and PS seismic data without prior alignment of the data avoids the drawbacks of inaccurate time alignment of PP and PS seismic data simultaneously inverting PP and PS seismic data in their natural time domains. FIG. 2 is a flowchart of a method 200 for simultaneously inverting PP and PS seismic amplitudes in native time domains with optimized registration through travel times' estimations. Method 200 includes obtaining PP and PS seismic data acquired during a seismic survey of a multi-layer structure, at 210.

Method 200 then includes jointly inverting the PP and the PS seismic data in a stratigraphic grid, using different time axes for PP and PS reflections, at 220. A ratio of PP and PS wave travel times inside a same layer cell is a function of a ratio of the P-wave propagation velocity and the S-wave propagation velocity, $V_p/V_s$, therein.

Multiple time axes can be used when applying inversion to seismic data. For example, in a simultaneous 4D (i.e., combining sets of 3D—horizontal coordinates and time—survey data acquired at a substantial interval) inversion disclosed in the article, "Global 4D Inversion and Time-Lapse Fluid Classification," by Lafet Y. et al. published in 79$^{th}$ SEG Conference Extended Abstracts, 2009, pp. 3830-3834 (the contents of which is incorporated in its entirety herein by reference), a time axis is defined for each 3D data set so that 4D time-shifts are determined as a part of the inversion's solution. In a similar manner, different time axes are used when generating PP and PS synthetic data, while the acquired seismic data remains in its native time domain.

Figure 3:
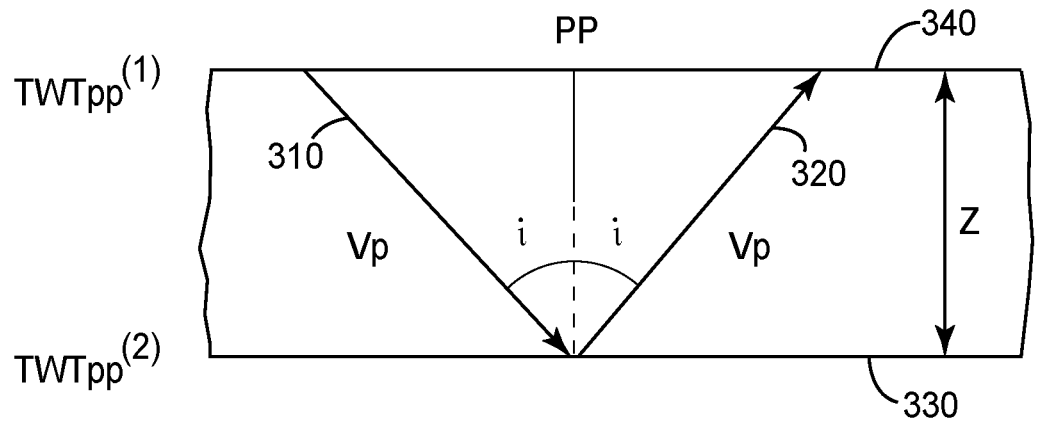
FIG. 3 illustrates an incident P-wave and a reflected P-wave inside a layer of the stratigraphic grid.

FIG. 3 illustrates an incident P-wave 310 and a P-wave 320 reflected at bottom surface 330 of a layer having a thickness z (in depth) between layer surfaces 330 and 340. The P-wave reflection angle i is equal to the incident angle. A two-way traveling time of P waves TWT$_{PP}$(1) characterizes the depth of surface 340, and another two-way traveling time of P waves TWT$_{pp}$(2) characterizes the depth of interface 330. Thus, traveling time inside the layer of incident P-wave 310 and reflected P-wave 320 is:

$$\Delta TWT_{pp} = TWT_{pp}(2) - TWT_{pp}(1) = 2z/V_P \quad (1)$$

Figure 4:
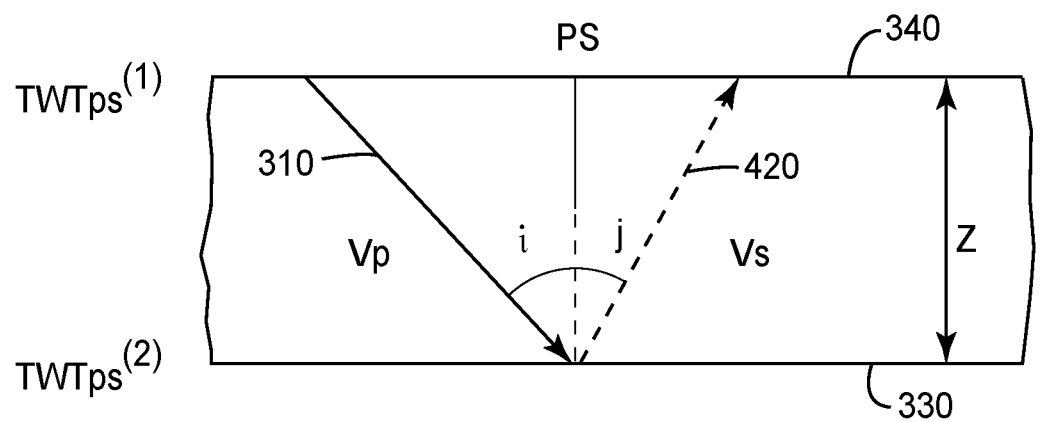
FIG. 4 illustrates an incident P-wave and a reflected S-wave inside a layer of the stratigraphic grid.

FIG. 4 illustrates the same incident P-wave 310 and a P-wave 420 reflected at bottom surface 330. The S-wave reflection angle j is smaller than the incident angle i as $V_p > V_s$. The traveling time interval inside layer of incident P-wave 310 and reflected S-wave 420 is:

$$\Delta TWT_{ps} = TWT_{ps}(2) - TWT_{ps}(1) = z(1/V_p + 1/V_s) \quad (2)$$

Since equations (1) and (2) refers to the same depth z, the following relationship is obtained between the ratio of $V_p$ and $V_s$ and the ratio of PP and PS wave travel times inside a layer:

$$V_p/V_s = 2\Delta TWT_{ps}/\Delta TWT_{pp} - 1 \quad (3)$$

or equivalent $$\Delta TWT_{ps}/\Delta TWT_{pp} = 1/2(V_p/V_s + 1) \quad (3')$$

Unlike in an orthogonal grid, in the stratigraphic grid, cell boundaries are defined using the interfaces between layers so the cells follow a layer organization. The stratigraphic grid may use time coordinates instead of a depth coordinate.

Inverting may be performed by simulated annealing, thus, including producing test models of the geophysical properties and travel times (see formula 3 and/or 3') inside the multi-layer structure, by perturbing a previous model (starting with the initial model). In one embodiment, for the initial model, values of geophysical properties in each cell of the stratigraphic structure may be obtained from well measurement and extrapolations of the well measurements. In another embodiment, these values may be based on results of a previous seismic survey.

Inversion may then include generating synthetic data corresponding to the PP and to the PS seismic data, based on a test model. The synthetic data may be created by a 1D convolution of reflectivity series and angle wavelets. The layer interfaces' reflectivities (i.e., effectiveness in reflecting energy) may be calculated using the Zoeppritz equations (as described in Erdbebenwellen VIII B, "Über die Reflexion und Durchgang seismischer Wellen durch Unstetigkeitsflachen," published in 1919 in Gottinger Nachr. 1, pp. 66-84) or Aki and Richards approximations (as set forth in the book Quantitative Seismology, 2nd edition, 1980, University Science Books).

In one embodiment, the PP and PS reflectivities ($R_{PP}$ and $R_{PS}$ respectively) are calculated as:

$$R_{PP} = \frac{1}{2}(1 - 4\overline{V}_s^2 p^2)\frac{\Delta\rho}{\overline{\rho}} + \frac{1}{2\cos^2 i}\frac{\Delta V_p}{\overline{V}_p} - 4\overline{V}_s^2 p^2 \frac{\Delta V_s}{\overline{V}_s} \quad (4)$$

$$R_{PS} = \frac{-p\overline{V}_p}{2\cos j}$$

$$\left[\left(1 - 2\overline{V}_s^2 p^2 + 2\overline{V}_s^2 \frac{\cos i}{\overline{V}_p}\frac{\cos j}{\overline{V}_s}\right)\frac{\Delta\rho}{\overline{\rho}} - 4\overline{V}_s^2\left(p^2 - \frac{\cos i}{\overline{V}_p}\frac{\cos j}{\overline{V}_s}\right)\frac{\Delta V_s}{\overline{V}_s}\right] \quad (5)$$

where $\overline{\rho}$, $\overline{V}_p$ and $\overline{V}_s$ are mean values of density, P- and S-wave propagation velocities above and below a layer interface (e.g., $\rho_1$, $V_{P1}$, $V_{S1}$, above surface 330 in FIGS. 3 and 4 and $\rho_2$, $V_{p2}$, $V_{s2}$, below surface 330); $\Delta\rho$, $\Delta V_p$ and $\Delta V_s$ are the change in density, P- and S-wave propagation velocities across the surface, i is the P-wave's incident angle on the interface, j is the S-wave's reflected angle (angles i and j are labeled in FIGS. 3 and 4) and p is the ray parameter given by $$p = \sin i/\overline{V}_p = \sin j/\overline{V}_s \quad (6)$$

Figure 5:
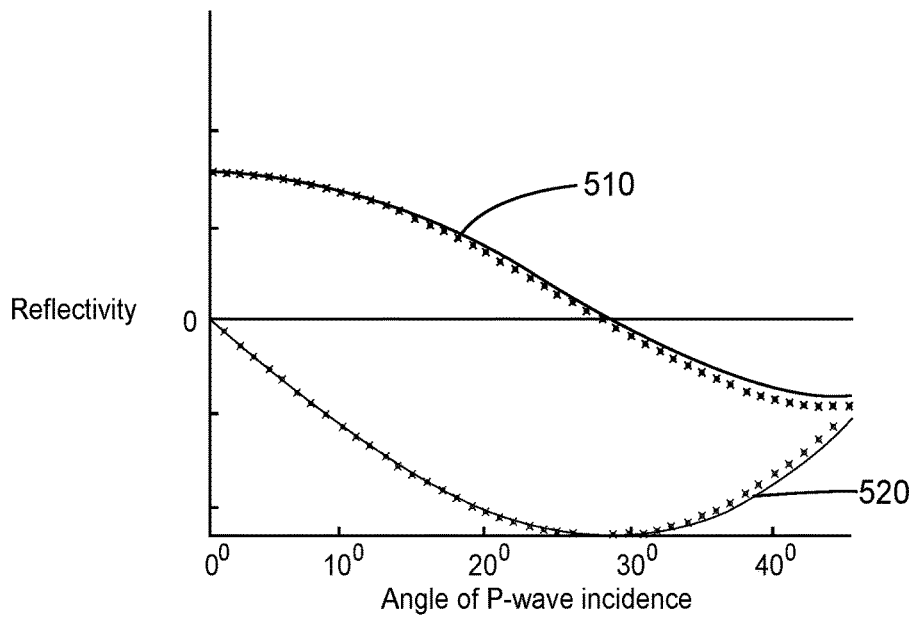
FIG. 5 is a graph illustrating reflectivities variation with the incidence angle.

FIG. 5 is a graph illustrating an example of reflectivities' variation with the incidence angle. Line 510 corresponds to $R_{PP}$ and line 520 to $R_{PS}$ (the lines are the exact Zoeppritz equations, crosses are the Aki and Richards approximations).

The test model that minimizes a cost function may be selected to stand for the actual multi-layer structure. The cost function includes a term depending on the difference between the seismic data and the synthetic data, and other terms that express the predetermined rules. For example, one of the other terms may depend on a distance between the initial model and a test model. Such a term constrains the test model not to become too different from the initial model. Another term may ensure continuity, limiting geophysical property variations from one cell to an adjacent cell.

The inversion iteratively converges to a model that simultaneously and substantially matches the PP and PS amplitudes (via the reflectivities and wavelets) and the travel times (via the Vp/Vs ratio shown in equations 3'). The density is constrained by the PP and PS amplitudes, the P-wave propagation velocity is constrained by the PP amplitudes and travel times, and the S-wave propagation velocity is constrained by the PP and PS amplitudes and the travel times.

The number of test models may be predetermined, whether or not the strategy of producing test models is influenced by the manner in which the seismic data differs from the synthetic data. In some embodiments, criteria of the model satisfactory matching the actual multi-layer structure may be used to freeze (stop varying) the model in certain regions of the multi-layer structure (e.g., for less deep layers) or to stop producing new models and generating new synthetic data for the entire multi-layer structure.

Figure 6:
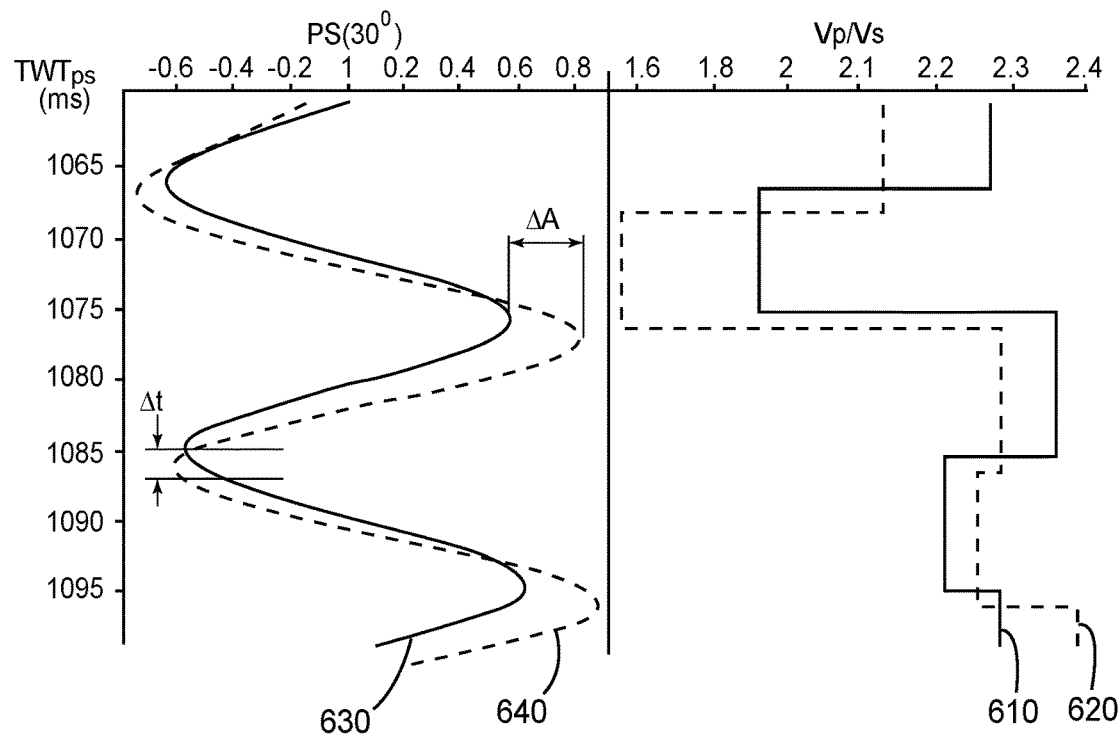
FIG. 6 is graphs sharing the time axis (vertical) and illustrating the effect of erroneous $V_p/V_s$, values on both the amplitude and timing of PS synthetic data.

FIG. 6 shows graphs sharing the same PS time axis (vertical) and illustrating the impact of varying $V_p/V_s$, values on both the amplitude and travel time of PS synthetic data. The different values of the $V_p/V_s$ ratio are on line 610 and on line 620 in the right-side graph, respectively. The left-side graph in FIG. 6 emphasizes the difference ΔA in PS wave amplitude (between parallel vertical lines) and the time shift Δt of PS peaks (between parallel horizontal lines) for synthetic data generated using the different values of $V_p/V_s$: line 630 corresponds to $V_p/V_s$ on line 610, and line 640 corresponds to $V_p/V_s$ on line 620.

Figure 7:
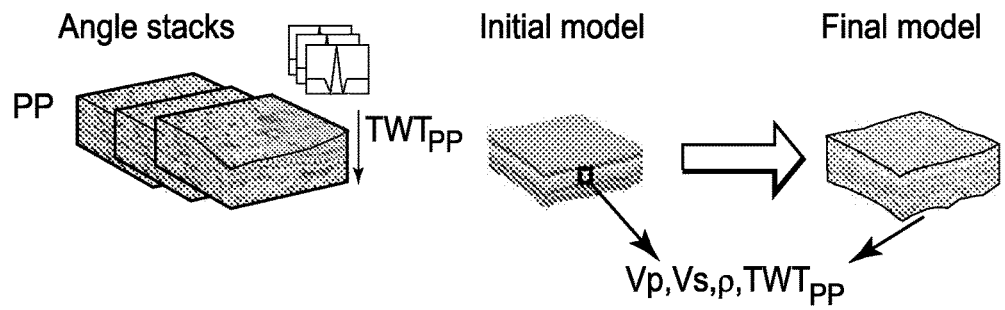
FIG. 7 illustrates elements of inversion methods using only PP seismic data.
Figure 8:
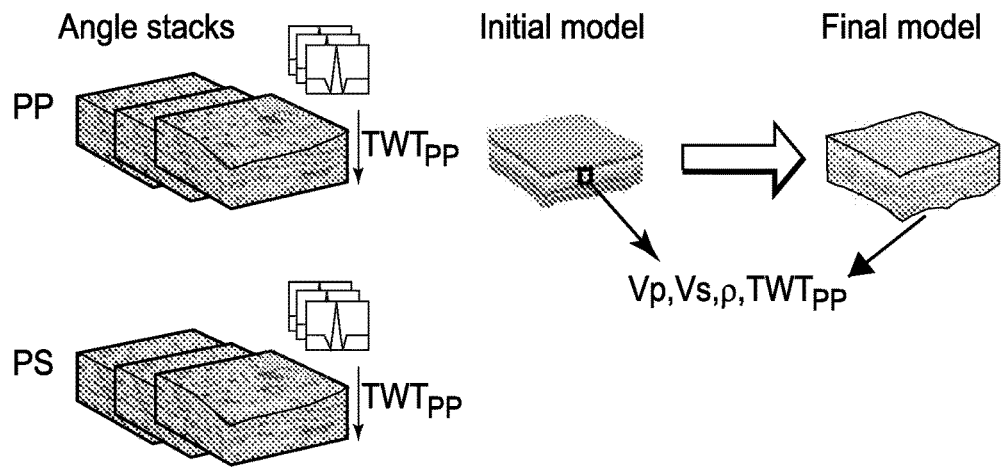
FIG. 8 illustrates elements of inversion methods using PP and PS seismic data in the same domain (the PS data is squeezed and aligned to the PP data prior to the inversion)
Figure 9:
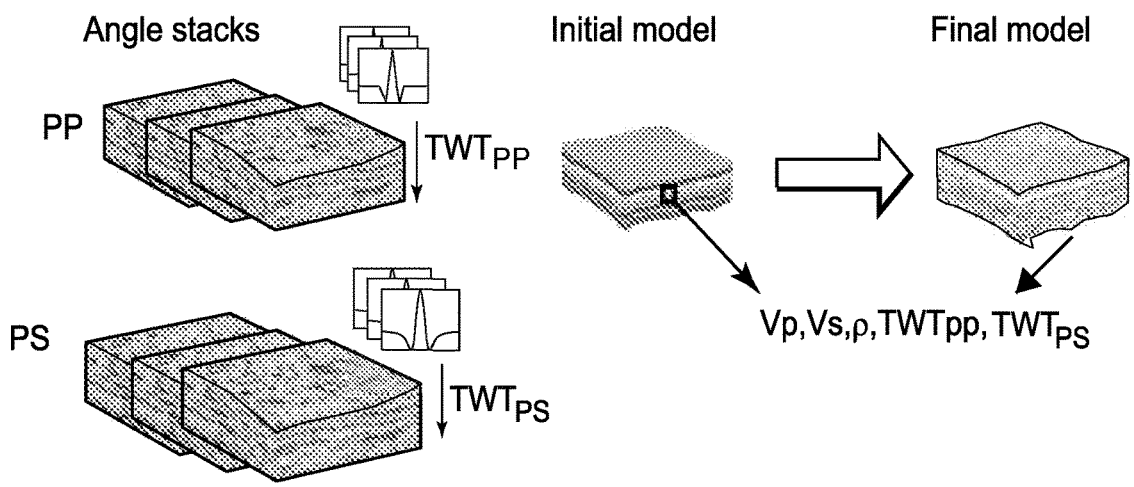
FIG. 9 illustrates elements of inversion methods using PP and PS seismic data in native time domains according to an embodiment.

FIGS. 7-9 illustrate inversion methods using only PP seismic data, using PP and PS data aligned in PP times, and using PP and PS seismic data in native time domains according to an embodiment, respectively. The leftmost portion of these figures illustrates the input data, the middle portion illustrates the initial model and the stratigraphic grid and the rightmost portion stands for the final model, respectively. Here, $TWT_{pp}$ stands for a two-way time in PP native time domain and $TWP_{ps}$ stands for a two-way time in PS native time domain.

Figure 10:
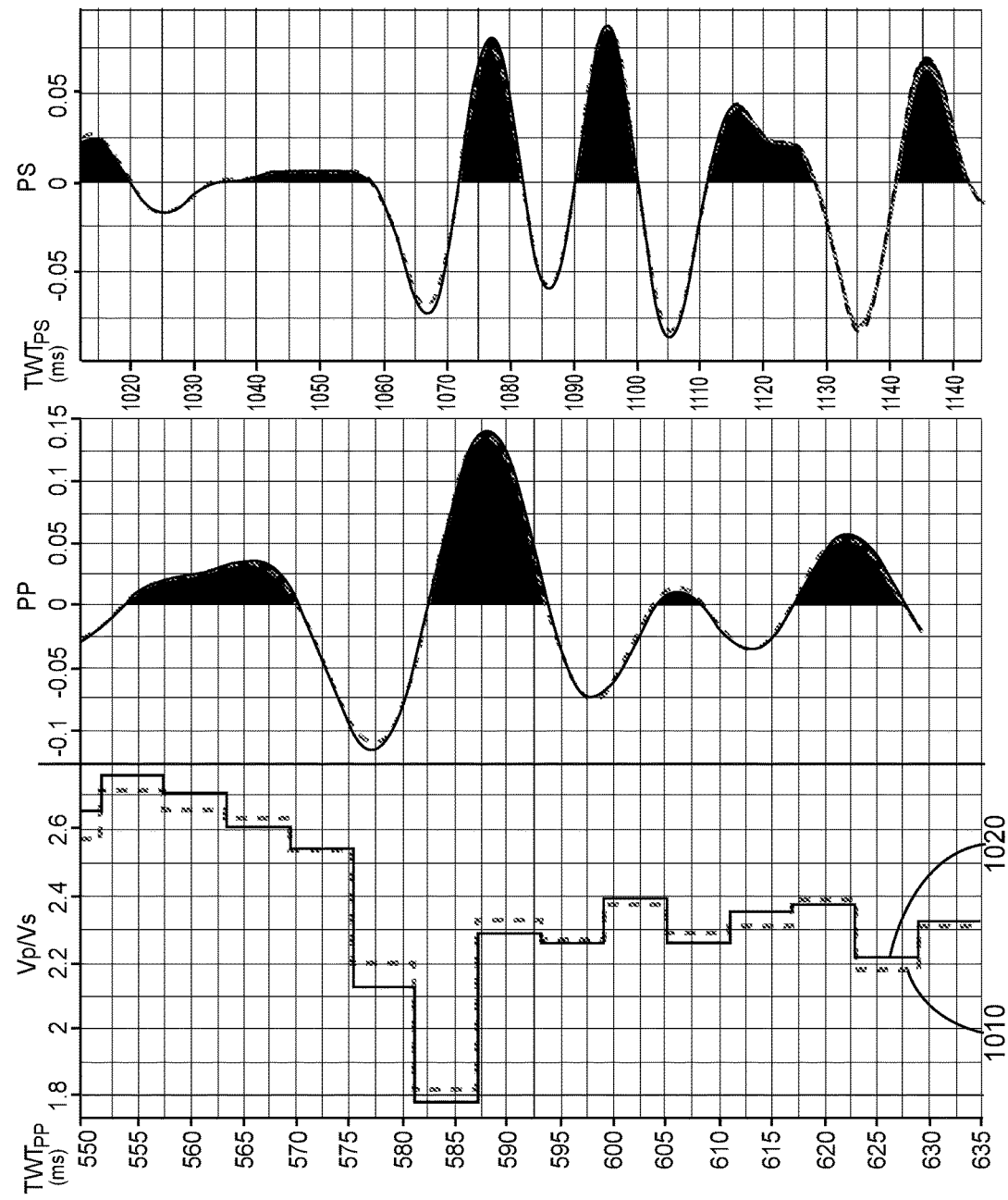
FIG. 10 illustrates results obtained with a method according to an embodiment.

In the final model resulting from an inversion according to an embodiment, the geophysical properties values have been optimized so that the synthetic PP and PS data match the seismic data both in time and amplitudes, and are consistent with log data. FIG. 10 shows graphs sharing the PP time axis (vertical) and illustrating $V_p/V_s$ values according to the final model (line 1010), and to the upscaled log data (line 1020) in PP times, and a graph of corresponding synthetic PS data with a PS time axis. In the middle and right side graphs, PP and PS synthetic data is illustrated with the dash lines and PP and PS seismic data are black, filled areas, respectively. The cross-correlation of the data and the final model is close to 100%.

Figure 11:
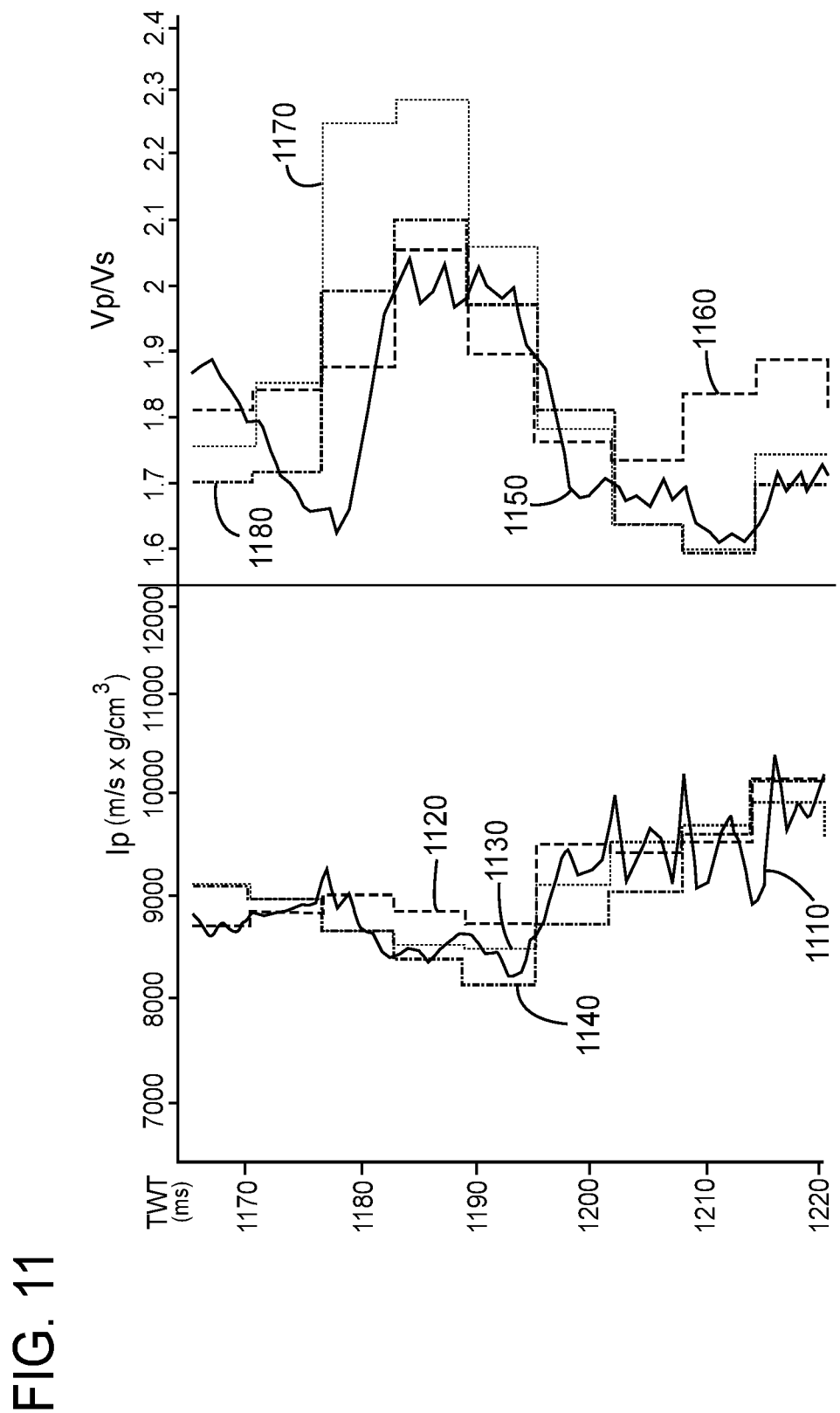
FIG. 11 is graphs illustrating results of different inversion methods versus well measurements.

FIG. 11 is another illustration of the results obtained with the methods in FIGS. 7-9. The two graphs in FIG. 11 have a common vertical time axis, and the horizontal axis of the left-side graph is the P impedance, lp, (i.e., product of density and P-wave propagation velocity), and the horizontal axis of the right-side graph is the ratio of P- and S-wave propagation velocities, $V_p/V_s$. Lines 1110 and 1150 correspond to the well log data, lines 1120 and 1160 are the result of PP only inversion (as in FIG. 7), lines 1130 and 1170 correspond to the result of the PP and aligned PS seismic data inversion (as in FIG. 8), and lines 1140 and 1180 correspond to the result of the joint PP and PS seismic data inversion in native time domains with optimized registration (as in FIG. 9), according to an embodiment. During the joint inversion, the relationship between the ratio of PP and of PS travel times inside the same layer cell and the ratio of P-wave and S-wave propagation velocity (i.e., equation 3 or 3') is observed. The results of the joint inversion method according to an embodiment better match the log data.

Cross-correlation of $V_p/V_s$ values obtained from the well log data and results of inversion using PP seismic data only is about 80%, cross-correlation of $V_p/V_s$ values obtained from the well log data and results of inversion using PP and aligned PS seismic data is about 82% and cross-correlation of $V_p/V_s$ values obtained from the well log data and results of joint inversion using PP and PS seismic data in native time domains with optimized registration is about 87%. Thus, the latter inversion method yields a structural model that better matches log data than conventional methods (i.e., inversion using PP seismic data only and inversion using PP seismic data and aligned PS data).

Figure 12:
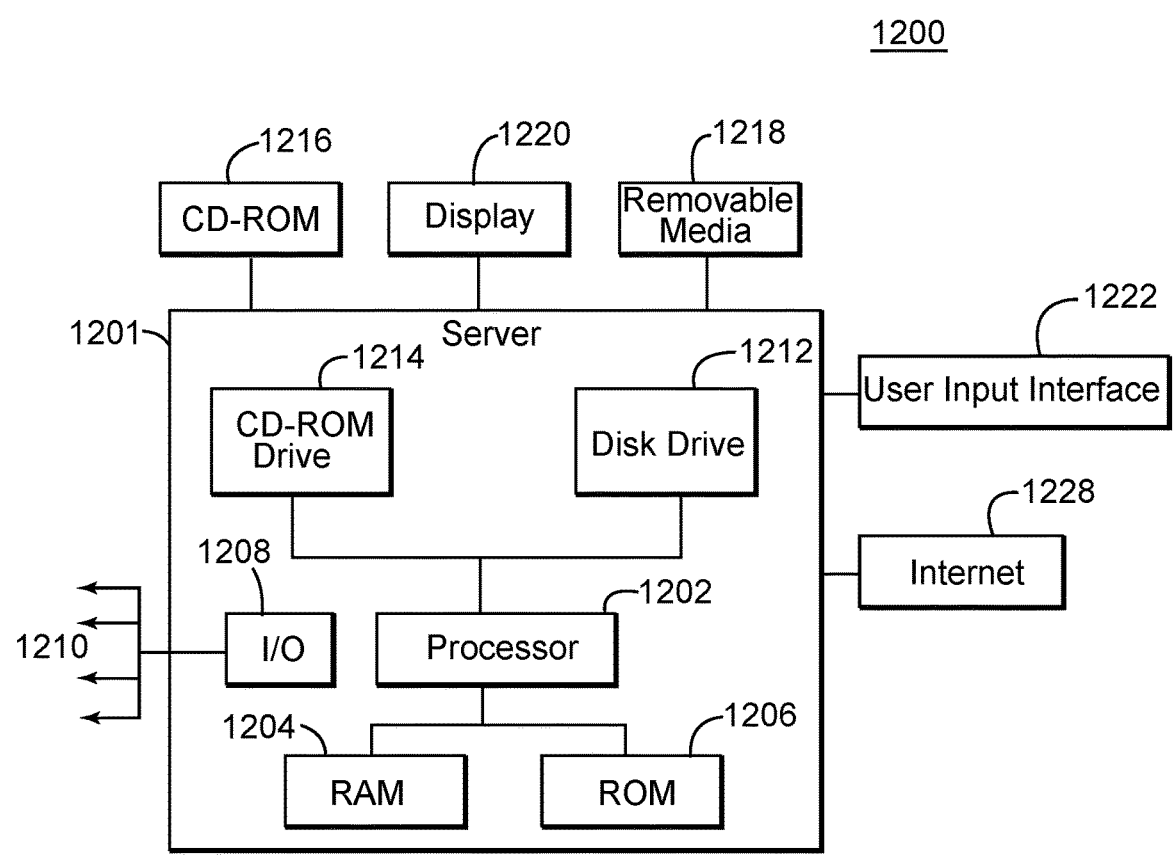
FIG. 12 is a block diagram of a computing apparatus according to an embodiment.

FIG. 12 illustrates a block diagram of a seismic data processing apparatus 1200 according to an embodiment. Apparatus 1200 is configured to perform methods for joint PP and PS seismic data inversion in native time domains with optimized registration. Hardware, firmware, software or a combination thereof may be used to perform the various steps and operations. Processing device 1200 may include server 1201 having a central processor unit (CPU) 1202 having one or more processors. CPU 1202 is coupled to a random access memory (RAM) 1204 and to a read-only memory (ROM) 1206. ROM 1206 may also be other types of storage media to store programs, such as programmable ROM (PROM), erasable PROM (EPROM), etc. Methods according to various embodiments described in this section may be implemented as computer programs (i.e., executable codes) non-transitorily stored on RAM 1204 or ROM 1206. CPU 1202 may communicate with other internal and external components through input/output (I/O) circuitry 1208 and bussing 1210, which are configured to obtain the seismic data. CPU 1202 is configured to invert the PP and the PS seismic data in a stratigraphic grid, using different time axes for PP and PS reflections.

Server 1201 may also include one or more data storage devices, including disk drive 1212, CD-ROM drive 1214, and other hardware capable of reading and/or storing information (e.g., seismic data before and after processing), such as a DVD, etc. In one embodiment, software for carrying out the above-discussed steps may be stored and distributed on a CD-ROM 1216, removable media 1218 or other form of media capable of storing information. The storage media may be inserted into, and read by, devices such as the CD-ROM drive 1214, disk drive 1212, etc. Server 1201 may be coupled to a display 1220, which may be any type of known display or presentation screen, such as LCD, plasma display, cathode ray tube (CRT), etc. Server 1201 may control display 1220 to exhibit images of the multi-layer structure. A user input interface 1222 is provided, including one or more user interface mechanisms such as a mouse, keyboard, microphone, touch pad, touch screen, voice-recognition system, etc.

Server 1201 may be coupled to other computing devices, such as the seismic data acquisition equipment, via a network. The server may be part of a larger network configuration as in a global area network (GAN) such as the Internet 1228, which allows ultimate connection to various devices.

The disclosed exemplary embodiments provide methods and devices for inverting PP and PS seismic data in a stratigraphic grid, using different time axes for PP and PS reflections. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A seismic exploration method for simultaneously inverting PP and PS seismic amplitudes in native time domains with optimized registration through travel times' estimations, the method comprising:
    obtaining PP and PS seismic data acquired during a seismic survey of a multi-layer structure; and
    jointly inverting the PP and the PS seismic data in a stratigraphic grid defined by interfaces between layers, using different time axes for PP and PS reflections to obtain an image of the multi-layer structure usable to assess presence of oil and/or gas reservoir, wherein a ratio of PP and of PS waves travel times inside each layer cell is a function of a ratio of a P-wave propagation velocity and of an S-wave propagation velocity therein, wherein the function takes into consideration that, for the PP waves travel time, an incident and a reflected P-wave have same P-wave propagation velocity and an incident angle substantially equal to a P-reflection angle, while, for PS waves travel time, the incident and a reflected S-wave have different propagation velocities and an S-reflection angle different from the incident angle.

2. The method of claim 1, wherein the inverting includes:
producing test models of geophysical properties inside the multi-layer structure by perturbing a previous model according to predetermined rules;
generating synthetic data corresponding to the PP and to the PS seismic data, using each of the test models; and
selecting one of the test models that minimizes a cost function depending on differences in amplitudes and travel times between the seismic data and the synthetic data.

3. The method of claim 2, wherein the cost function incorporates constraints on a distance between the previous model and a model for which the cost function is calculated, and on a spatial continuity of the model.

4. The method of claim 2, wherein the geophysical properties include density, the P-wave propagation velocity and the S-wave propagation velocity.

5. The method of claim 2, further comprising generating an initial model of the multi-layer structure.

6. The method of claim 5, wherein, for the initial model, values of geophysical properties in each cell of the stratigraphic structure are obtained from well measurement and extrapolations of the well measurements.

7. The method of claim 6, wherein, for the initial model, values of geophysical properties in each cell of the stratigraphic structure are based on results of a previous seismic survey.

8. The method of claim 2, wherein PP and PS reflectivities are calculated as $$R_{PP} = \frac{1}{2}(1 - 4\overline{V}_s^2 p^2)\frac{\Delta\rho}{\overline{\rho}} + \frac{1}{2\cos^2 i}\frac{\Delta V_p}{\overline{V}_p} - 4\overline{V}_s^2 p^2 \frac{\Delta V_s}{\overline{V}_s}, \text{ and}$$

$$R_{PP} = \frac{-p\overline{V}_p}{2\cos j}\left[\left(1 - 2\overline{V}_s^2 p^2 + 2\overline{V}_s^2 \frac{\cos i \cos j}{\overline{V}_p \overline{V}_s}\right)\frac{\Delta\rho}{\overline{\rho}} - 4\overline{V}_s^2\left(p^2 - \frac{\cos i \cos j}{\overline{V}_p \overline{V}_s}\right)\frac{\Delta V_s}{\overline{V}_s}\right]$$

where $\overline{\rho}$, $\overline{V}_p$ and $\overline{V}_s$ are mean values of density, P and S wave propagation velocities above and below a layer interface, $\Delta\rho$, $\Delta V_p$ and $\Delta V_s$ are the change of the density, P and S wave propagation velocities across the interface, i is the P-wave's incident angle on the interface, j is the S-wave's reflected angle and p is a ray parameter given by $$p = \sin i/\overline{V}_p = \sin j/\overline{V}_s.$$

9. The method of claim 1, wherein the ratio of PP and of PS waves travel times inside the same layer cell, $\Delta TWT_{ps}/\Delta TWT_{pp}$ depends on the ratio of a P-wave propagation velocity and of an S-wave propagation velocity, $V_p/V_s$ therein as $$\Delta TWT_{ps}/\Delta TWT_{pp} = 1/2(V_p/V_s + 1).$$

10. The method of claim 2, wherein traces extracted from seismic data are grouped in incidence angle bins.

11. A seismic data processing apparatus comprising:
a communication interface configured to obtain PP and PS seismic data acquired during a seismic survey of a multi-layer structure; and
a data processing unit configured to jointly invert the PP and the PS seismic data in a stratigraphic grid defined using interfaces between layers, using different time axes for PP and PS reflections to obtain an image of the multi-layer structure usable to assess presence of oil and/or gas reservoir, a ratio of PP and of PS waves travel times inside a same layer cell being a function of a ratio of a P-wave propagation velocity and of an S-wave propagation velocity therein,
wherein the function takes into consideration that, for the PP waves travel time, an incident and a reflected P-wave have same P-wave propagation velocity and an incident angle substantially equal to a P-reflection angle, while, for PS waves travel time, the incident and a reflected S-wave have different propagation velocities and an S-reflection angle different from the incident angle.

12. The apparatus of claim 11, wherein the data processing unit jointly inverts the PP and the PS data by:
producing test models of geophysical properties inside the multi-layer structure by perturbing a previous model according to predetermined rules;
generating synthetic data corresponding to the PP and to the PS seismic data, using each of the test models; and
selecting one of the test models that minimizes a cost function depending on differences between the seismic data and the synthetic data.

13. The apparatus of claim 12, wherein the cost function incorporates constraints on a distance between the previous model and a model for which the cost function is calculated, and on a spatial continuity of the model.

14. The apparatus of claim 12, wherein the geophysical properties include density, the P-wave propagation velocity and the S-wave propagation velocity.

15. The apparatus of claim 12, wherein the data processing unit is further configured to generate an initial model of the multi-layer structure, with initial values of geophysical properties in each cell of the stratigraphic structure, the initial values being based on measurements.

16. The apparatus of claim 12, wherein the data processing unit calculates PP and PS reflectivities as $$R_{PP} = \frac{1}{2}(1 - 4\overline{V}_s^2 p^2)\frac{\Delta\rho}{\overline{\rho}} + \frac{1}{2\cos^2 i}\frac{\Delta V_p}{\overline{V}_p} - 4\overline{V}_s^2 p^2 \frac{\Delta V_s}{\overline{V}_s}, \text{ and}$$

$$R_{PP} = \frac{-p\overline{V}_p}{2\cos j}\left[\left(1 - 2\overline{V}_s^2 p^2 + 2\overline{V}_s^2 \frac{\cos i \cos j}{\overline{V}_p \overline{V}_s}\right)\frac{\Delta\rho}{\overline{\rho}} - 4\overline{V}_s^2\left(p^2 - \frac{\cos i \cos j}{\overline{V}_p \overline{V}_s}\right)\frac{\Delta V_s}{\overline{V}_s}\right]$$

where $\overline{\rho}$, $\overline{V}_p$ and $\overline{V}_s$ are mean values of density, P and S wave propagation velocities above and below a layer interface, $\Delta\rho$, $\Delta V_p$ and $\Delta V_s$ are the change of the density, P and S wave propagation velocities across the interface, i is the P-wave's incident angle on the interface, j is the S-wave's reflected angle and p is a ray parameter given by $$p = \sin i/\overline{V}_p = \sin j/\overline{V}_s.$$

17. The apparatus of claim 11, wherein the ratio of PP and of PS waves travel times inside the same layer cell, $\Delta TWT_{ps}/\Delta TWT_{pp}$ depends on the ratio of a P-wave propagation velocity and of an S-wave propagation velocity, $V_p/V_s$ therein as $$\Delta TWT_{ps}/\Delta TWT_{pp}=1/2(V_p/V_s+1).$$

18. A computer-readable recording medium non-transitorily storing executable codes which, when executed on a computer, make the computer perform a seismic exploration method for simultaneously inverting PP and PS seismic amplitudes, in native time domains with optimized registration through travel times' estimations, comprising:
- obtaining PP and PS seismic data acquired during a seismic survey of a multi-layer structure; and
- jointly inverting the PP and the PS seismic data in a stratigraphic grid defined using interfaces between layers, using different time axes for PP and PS reflections to obtain an image of the multi-layer structure usable to assess presence of oil and/or gas reservoir, a ratio of PP and of PS waves travel times inside a same layer cell being a function of a ratio of a P-wave propagation velocity and of an S-wave propagation velocity therein,
- wherein the function takes into consideration that, for the PP waves travel time, an incident and a reflected P-wave have same P-wave propagation velocity and an incident angle substantially equal to a P-reflection angle, while, for PS waves travel time, the incident and a reflected S-wave have different propagation velocities and an S-reflection angle different from the incident angle.

* * * * *